United States Patent [19]

Freiberg

[11] 4,215,915
[45] Aug. 5, 1980

[54] OBJECTIVE LENS HOLDING ARRANGEMENT FOR A MICRO-FILM READER

[75] Inventor: Günter Freiberg, Munich, Fed. Rep. of Germany

[73] Assignee: AGFA-Gevaert, A.G., Leverkusen, Fed. Rep. of Germany

[21] Appl. No.: 953,263

[22] Filed: Oct. 20, 1978

[30] Foreign Application Priority Data

Nov. 11, 1977 [DE] Fed. Rep. of Germany ....... 2750458

[51] Int. Cl.² .......................... G02B 7/04; G02B 7/18
[52] U.S. Cl. .................................. 350/255; 350/287;
  353/81; 353/101
[58] Field of Search ............... 350/187, 241, 255, 287;
  353/81, 100, 101

[56] References Cited

U.S. PATENT DOCUMENTS

| | | | |
|---|---|---|---|
| 3,817,601 | 6/1974 | Colaiace | 350/255 X |
| 3,951,522 | 4/1976 | Hashimoto | 350/187 |
| 3,981,574 | 9/1976 | Jesensky et al. | 353/81 X |
| 4,030,113 | 6/1977 | Obreschkow | 350/255 X |
| 4,154,510 | 5/1979 | Katagiri | 350/255 |

FOREIGN PATENT DOCUMENTS 1285288 12/1968 Fed. Rep. of Germany ........... 350/187

*Primary Examiner*—F. L. Evans

[57] ABSTRACT

An objective lens supporting arrangement for microfilm reader. The objective lens is axially movable and at the same time non-rotatably mounted with respect to a holding tube of the arrangement. An adjusting ring is coaxially mounted with respect to the holding tube and rotatable relative thereto. An angular displacement of the adjusting ring relative to the holding tube effects via cam means an axial adjustment of the objective lens for the purpose of focusing it.

6 Claims, 3 Drawing Figures

OBJECTIVE LENS HOLDING ARRANGEMENT FOR A MICRO-FILM READER

BACKGROUND OF THE INVENTION

The invention concerns an objective lens holding arrangement for a microfilm reader, wherein the objective lens is mounted in a cylindrical holding tube which is connected with an adjusting ring by means of a cam mechanism. An angular displacement of the adjusting ring effects an adjustment along the optical axis of the objective lens which corresponds to an axial displacement of the objective lens with respect to the holding tube.

There are already known objective lens holding arrangements of the afore-described type wherein the objective lens tube is threadably adjustably mounted in the objective lens holder or the objective lens tube is mounted in a helical groove of said holder, whereby the focusing of the microfiche to be projected by the objective lens is effected by turning the objective lens tube which causes an axial displacement of the objective lens tube relative to the objective lens holder.

SUMMARY OF THE INVENTION

It is a general object of the present invention to provide an objective lens mounting arrangement for a microfilm reader of the afore-described type, with which the angular position of the objective lens tube with respect to the holding tube remains unchanged during focusing.

In accordance with the invention, the objective lens tube is non-rotatably mounted in the holding tube and an adjusting ring is provided which is coaxially mounted with respect to the holding tube and surrounds the same and which is rotatable relative thereto. An angular displacement of the adjusting ring coacts with cam means and effects an axial displacement of the objective lens tube relative to the holding ring. The arrangement of the invention is advantageously provided with a pin-slot-connection. The slot defines a helical path about the optical axis. Moreover, the objective lens tube and the holding tube coact via a further pin-slot-connection, whereby the slot of this second connection extends parallel to the optical axis.

The afore-described objective lens mounting arrangement avoids in a simple manner a rotation of the objective lens tube during its focusing. The objective lens tube retains the same angular position with respect to the entire support arrangement. In this way it is possible, during the mounting of the objective lens in the objective lens tube to orient the lens in such a way that the optical distortions that generally occur in the peripheral edge regions of the objective lens due to flaws in the lens are as much as possible eliminated in the generally rectangular visual field which is projected in the microfilm reader.

In accordance with a further feature of this invention, the adjusting ring is provided with a helically shaped slit in which a projecting pin of the objective lens tube is guided. Moreover, a slit extends parallel to the optical axis on the holding tube and the pin radially projecting from the lens tube is guided in the latter slit also. The radially projecting pin from the objective lens tube extends into and therefore is guided in the slit of the holding tube as well in as in the helical slit of the adjusting ring.

The support arrangement of the invention is capable of providing a selective mounting and dismounting of different objective lens tubes having different focal distances. For this purpose, and in accordance with a further advantageous feature of this invention, the adjusting ring is provided with an opening for the easy introduction of the radially projecting pin into the helically shaped slit of the adjusting ring.

In order to selectively mount objective lenses of different focal lengths and thereby make possible the exchange of objective lenses, there is provided an inlet opening for the helically shaped slit which permits the introduction of the radially projecting pin therein. There is advantageously provides a stop notch in the helically shaped slit which determines the position of the adjusting ring at the time of introducing the pins into the helically shaped slit, said stop notch ensuring that during the exchange of objective lenses the adjusting ring is easily positioned into a position facilitating and ensuring an easy exchange of objective lenses.

According to a further particularly advantageous feature of this invention there is provided a stop surface which selectively prevents a positioning of the adjusting ring into a position other than that in which the pin can be introduced into its slit, which advantageously can be selectively placed into the rotary path of the adjusting ring. Hereby in particular there can be utilized a stop pawl which is pivotally mounted on the holding tube and which is maintained in its operative position by means of a spring and can be mainly pivoted into a release position. By means of this arrangement it is ensured that the adjusting ring cannot unintentionally be positioned into the lens exchange position, whereby it is avoided that the objective lens is unintentionally dropped out of the holding tube, for example, during transport of the arrangement, thereby preventing irreparable damage to the costly objective lens. Moreover, this feature of the support arrangement provides certain protection against the unauthorized removal of the objective lens.

The ability to use a non-rotatably mounted objective lens tube has also a significant advantage in microfilm readers having a rotary prism whereby the projected image that is projected onto a projection screen can be rotated into any preselected angular position. In the case of the objective lens supporting arrangement of the afore-described type there is provided in accordance with this invention that the objective lens tube contains the rotary prism, which was heretofore with the known objective lens support arrangemets not possible, because in the prior art arrangements the focusing of the objective lens was forcibly carried out jointly with the rotary prism so that both the objective lens and the prism where rotated jointly. By mounting the rotary prism in the objective lens tube one obtains the advantage of a simplified construction, in particular spatial saving which dispenses with the separate space required for a separate rotary prism support. Moreover, the rotary prism mounting in accordance with the invention insures that the rotary prism is mounted on a simple, reliable and forcibly defined adjustment path which is adjusted along the optical axis of the objective lens.

BRIEF DESCRIPTION OF THE DRAWING

The invention accordingly consists in the features of construction, combination of elements, and arrangement of parts which will be exemplified in the device hereinafter described and of which the scope of the application will be indicated in the appended claims.

In the accompanying drawing several possible embodiments are shown of the invention.

DETAILED DESCRIPTION

Figure 1:
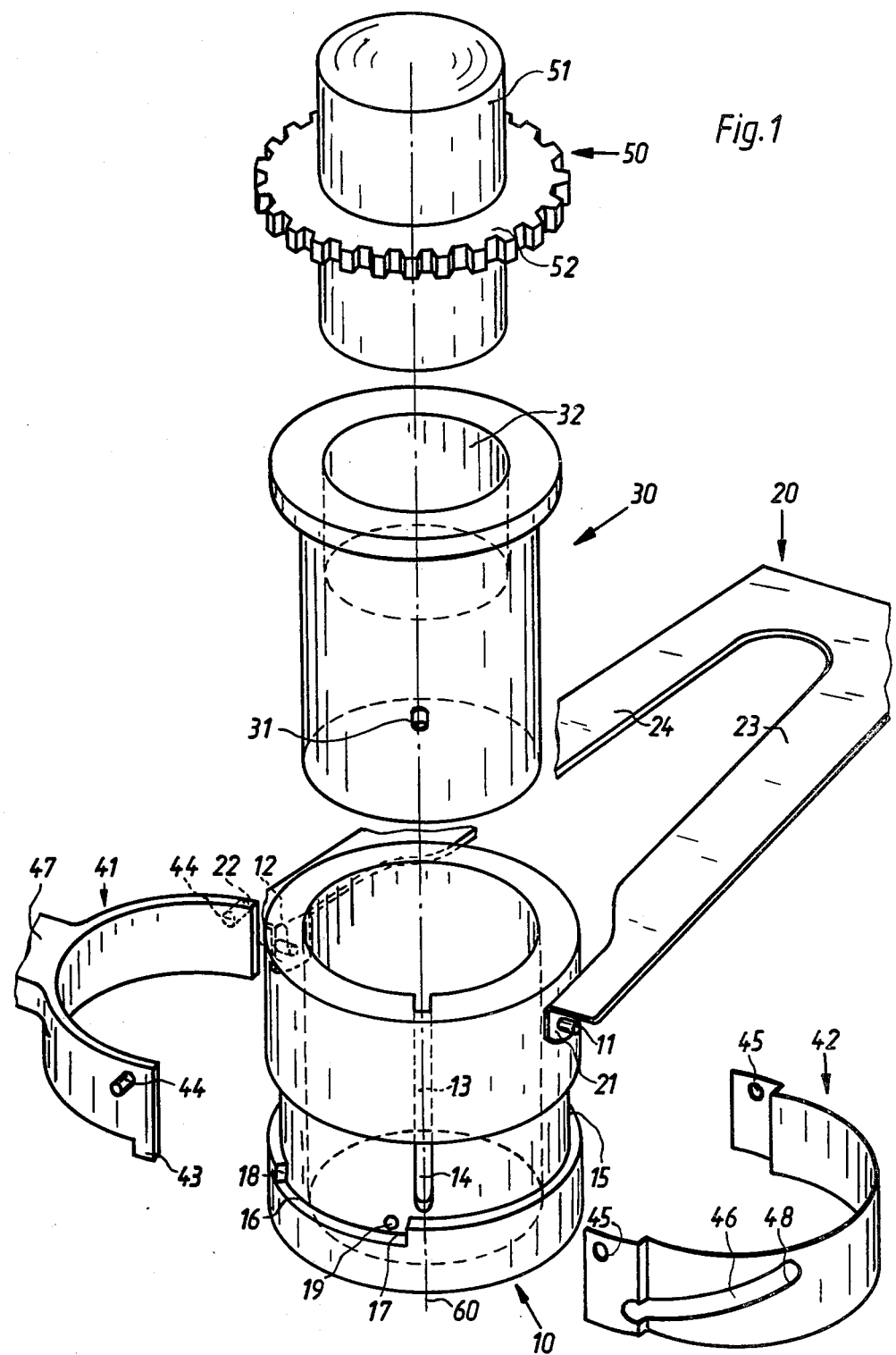
FIG. 1 is a perspective explosvie view of the objective support arrangement including the objective lens and rotary prism.

In FIG. 1 there is illustrated a generally cylindrical holding tube which is generally designated with the reference number 10. This holding tube 10 is pivotally mounted by a pair of diametrically extending holding pins 11, 12 on the lobes 21, 22 of a pair of shanks 23, 24 of a resilient support plate 20. Such a type of mounting provides a uniform bearing of the underside of the objective lens holding tube 10 onto the transparent cover plate of a non-illustrated microfilm reader. The general construction of a suitable microfilm reader can, for example, be gleaned from U.S. patent application Ser. No. 817,730, filed July 21, 1977, entitled MICROFILM READER and coassigned with the instant application.

The objective lens holding tube 10 has a cylindrical bore for receiving an objective tube 30 which includes the projection objective lens (not illustrated). There is provided along the inner wall surface of the holding tube 10 a groove 13 extending parallel to the optical axis 60 of the objective lens. A slot 14 transversely extending from the inner to the outer periphery of the holding tube 10 forms a lower extension of the groove 13 as illustrated in FIG. 1. The holding tube 10 further has an annular groove 15 which serves to receive a guide an adjusting ring 40. The adjusting ring 40 is formed by two halves 41 and 42 which have a width corresponding to the width of the annular groove 15. The annular groove 15 has a widened cutout portion 16 which serves to receive a stop 43 extending downwardly from the ring half 41 of the adjusting ring 43. This stop 43 jointly with the stop surfaces 17 and 18 serves to limit the angular movement of the adjusting ring 42 when it is mounted about the holding tube 10.

Figure 2:
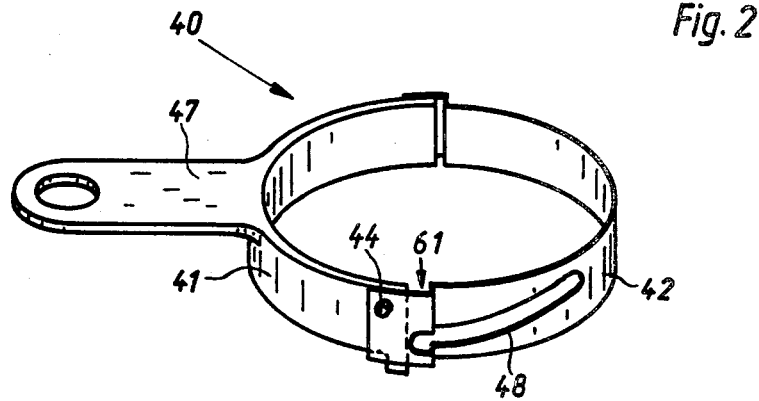
FIG. 2 is a perspective view of the assembled adjustment ring in accordance with the arrangement of FIG. 1.

The adjusting ring 40 is illustrated in an assembled condition and in perspective in FIG. 2. As mentioned hereinabove, the adjusting ring 40 is constituted by two ring halves 41, 42. The two ring halves are connected to each other by means of a pair of pins 44 projecting from the ring half 41 and extending into mating openings 45 of the ring half 42. The ring half 42 is furthermore provided with a helically shaped slit 46.

The objective tube 30 has a radially outwardly projecting guide pin 31 and is mounted in the holding tube in such a way that the pin 31 is guided in the groove 13, respectively the slot 14. The objective lens tube 30 is therefore mounted non-rotatably in the holding tube 10.

The insertion or removal of the objective lens tube 30 from the holding tube 10 is only possible when the adjusting ring 40 has assumed such a position that the ingress opening 61 (see FIG. 2) which is defined between the two ring halves 41 and 42 is situated in the region of the slit 14. This is always the case when the adjusting ring 40 has been turned to such an extent counterclockwise that the stop nose 43 thereof abuts against the stop surface 17. In this position there is snap detent connection between the adjusting ring 40 due to a snap projection 19 extending from the bottom of the cutout 16 of the annular groove 15 which coacts with the stop nose 43 of the ring half 41, thereby releasably holding the adjusting ring 40 in the afore-described position.

When the objective lens tube 30 is introduced into the holding tube 10 the adjusting ring 40 is turned clockwise by means of the handle 47 and thereby the guide pin 31 and the appurtenant objective lens tube 30, due to the cam action of the helical slit 46 having a cam surface 48 is moved upwardly. A removal of the objective lens tube 30 after this turning by the adjusting ring 40 from its stop position is no longer possible.

The objective lens tube 30 has in its operation region a hollow space 32 for receiving the rotary prism 50. This rotary prism 50 can be selectively mounted in the objective lens tube 30 and is rotatable about the optical axis 60. The rotary prism 50 is provided with a cylindrical portion 51 and a coaxially mounted gear wheel 52 by means of which the arrangement can be adjusted by a toothed non-illustrated adjusting rack or adjusting wheel mounted exteriorly from the illustrated arrangement which is adapted to angularly turn the rotary prism 50 within the lens tube 30 into any preselected angular position.

Figure 3:
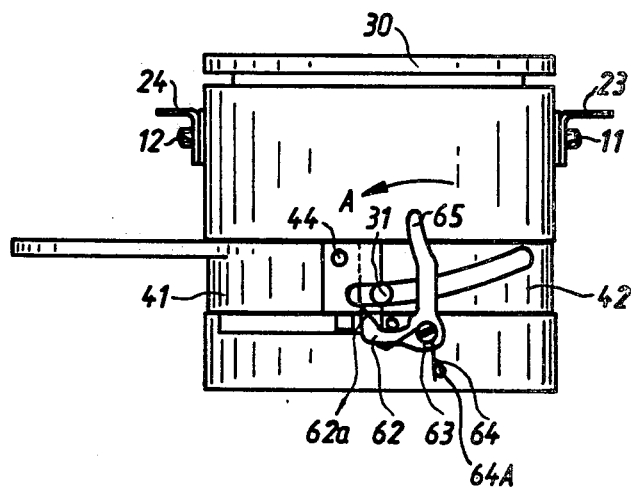
FIG. 3 is an elevational side view of the objective lens support arrangement in accordance with FIG. 1 in which there is also illustrated an appurtenant stop pawl.

FIG. 3 illustrates a side elevational view of the holding tube 10 of FIG. 1 wherein there has been mounted an objective lens tube 30. The arrangement is provided with a locking pawl 62 having connected thereto an actuating lever 65. This locking pawl 62 is pivotally mounted on a pivot support 63 radially extending from the holding tube 10. A two-armed spring 64 engages with one arm the locking pawl 62 and with its other end coacts with a stop 64a extending from the holding tube 10. This spring 64 urges the locking pawl 62 into a position whereby the free nose end 62a thereof is in the path of movement of the stop nose 43, whereby this stop nose 43, in this embodiment of the invention extends beyond the outer periphery of the holding tube 10. The adjusting ring 40 can, as is explained hereinbelow, assume its release position, in which the objective lens tube 30 can be exchanged, without any difficulty. This has the advantage that the objective lens cannot accidentally slip out of the support arrangement for example during transporting of the microfilm reader. Furthermore, the arrangement provides a certain amount of security against unauthorized removal of the objective lens.

When the objective lens is to be exchanged, the lock pawl 62 must first of all be pivoted in the direction of the arrow A. This pivotal movement of the lock pawl 62 causes a moving away of the pawl from the path of movement of the stop nose 43. Now the adjusting ring can be positioned in its release position and the objective lens can be removed in exchange for the new objective lens.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. An objective lens holding arrangement for a microfilm reader, comprising in combination, an objective lens tube for mounting an objective lens therein, said objective lens tube having a pin projecting therefrom;

a holding tube adapted to adjustably non-rotatably coaxially support said objective lens tube, said holding tube being operatively mounted in said microfilm reader and having a first straight slot extending parallelly to the optical axis of said objective lens;

an adjusting ring coaxially and rotatably mounted on said holding tube, and having a second helical slot, the helix of which said helical slot forms part of is coaxial with the optical axis of said optical lens;

said pin extending into said first and second slots, so that the movement of said objective lens tube relative to said holding tube and adjusting ring is guided by said first and second slots respectively;

said helical slot in said adjusting ring includes a portion of enlarged diameter relative to the remainder of the helical slot to facilitate the introduction of said pin into said helical slot.

2. The objective lens holding arrangement as set forth in claim 1, including detent means operatively mounted on said adjusting ring and said holding tube and adapted to releasably hold said adjusting ring in a release position wherein said pin can be introduced through said portion of enlarged diameter of said helical slot.

3. The objective lens holding arrangement as set forth in claim 2, including stop means operatively mounted on said holding tube and adapted to be selectively positioned in the path of movement of that portion of said detent means which is mounted on said adjusting ring to selectively prevent the positioning of said adjusting ring in said release position.

4. The objective lens holding arrangement as set forth in claim 3, wherein said stop means include a two-armed lever pivotally mounted on said holding tube, said two-armed lever having a first arm adapted to be moved into a blocking position wherein it blocks the movement of said adjusting ring into said release position, and a second arm, biasing means connected to said second arm and adapted to urge said first arm into said blocking position.

5. An objective lens holding arrangement for a microfilm reader, comprising in combination, an objective lens tube for mounting an objective lens therein, said objective lens tube having a pin projecting therefrom;

a holding tube adapted to adjustably non-rotatably coaxially support said objective lens tube, said holding tube being operatively mounted in said microfilm reader and having a first straight slot extending parallelly to the optical axis of said objective lens;

an adjusting ring coaxially and rotatably mounted on said holding tube and having a second helical slot, the helix of which said helical slot forms part of is coaxial with the optical axis of said optical lens;

said pin extending into said first and second slots so that the movement of said objective lens tube relative to said holding tube and adjusting ring is guided by said first and second slots respectively;

a rotary prism which is coaxially rotatably adjustably mounted in said objective lens tube about the optical axis of said objective lens.

6. The objective lens holding arrangement as set forth in claim 5, wherein said rotary prism is mountably and dismountably mounted in said objective lens tube.

* * * * *